United States Patent Office 3,484,312
Patented Dec. 16, 1969

3,484,312
METHOD FOR FORMING ALLOY CONTACTS TO GALLIUM ARSENIDE

Felix Ermanis, Summit, and Bertram Schwartz, Westfield, N.J., assignors to Bell Telephone Laboratories, Incorporated, Murray Hill and Berkeley Heights, N.J., a corporation of New York No Drawing. Filed Dec. 28, 1966, Ser. No. 605,281
Int. Cl. H01l 7/46
U.S. Cl. 148—182 5 Claims

ABSTRACT OF THE DISCLOSURE

Alloy contacts are formed upon gallium arsenide by coating the contact region with a divalent chloride or bromide of tin or lead and heating the resultant coating for a time period sufficient to decompose the chloride or bromide and to effect alloying of free metal with the gallium arsenide.

This invention relates to a method for making low-temperature alloy contacts to gallium arsenide.

The problem of wetting of a solid surface by a molten metal takes on special significance in the fabrication of active semiconductor devices, for not only is intimate, high-strength bonding required but specific electrical properties are usually sought at the same time. The alloyed contact between the metal and the semiconductor and the resulting electrical properties are dependent upon the degree of wetting in the initial stages of the alloying process. The standard technique of placing a metal to be alloyed on a semiconductor and heating in a reducing atmosphere or vacuum, while successful with elemental semiconductors such as silicon or germanium, does not give good reproducible results on gallium arsenide. The desirable metals, such as tin, lead, zinc, cadmium, etc., do not wet the gallium arsenide uniformly at their melting points. Consequently, either the metal does not alloy or it does so in a spotty, unreproducible manner. The invention is directed to a simple, versatile and extremely effective method for making alloy contacts to gallium arsenide.

In accordance with the present invention, a halide of metal destined for contact with the gallium arsenide is deposited thereon and heated for a time period sufficient to decompose the halide, so leaving the free metal on the gallium arsenide surface. Continued heating of the gallium arsenide results in its alloying with the free metal. In the operation of the process, the wetting characteristics are controlled by the wetting ability of the halide which is extremely good rather than by the inferior wetting of the free metal.

A detailed description of the process of the invention will now be given.

The gallium arsenide employed in the practice of the invention evidenced carrier concentrations within the range of $10^{16}$–$10^{19}$ carriers/cm.$^3$ for both n- and p-type material and was grown by the horizontal Bridgman technique. All crystals employed were 111- or 100-oriented, lapped and chemically polished in methyl alcohol-bromine etchant and/or $H_2O_2$-$H_2SO_4$.

Selection of suitable metal halides for use in the practice of the invention is dictated by considerations relating to stability and suitability of the metal for contact purposes. Accordingly, the invention is restricted to chlorides and bromides of either tin or lead. Studies have revealed that the iodides tend to sublime, whereas fluorides are generally too stable. Furthermore, it has been determined that only the stannous and plumbous species of the bromides and chlorides are effective, the tetravalent salts being unsatisfactory. Therefore, four related compounds are considered within the scope of the invention, namely, $SnCl_2$, $SnBr_2$, $PbCl_2$ and $PbBr_2$.

Alloying in accordance with the invention was performed of a simple strip heater enclosed in a gas-tight box with provisions for flushing with nitrogen. All experiments were conducted in line nitrogen with no attempt to remove trace impurities, the temperature being monitored by a thermocouple placed at the surface of the strip heater.

In the operation of the process, the gallium arsenide was etched clean and coated with the metal halide of interest, coating being effected by direct application, dissolving the halide in a suitable solvent and dipping the gallium arsenide wafer therein or by evaporation techniques wherein the desired contact region or regions are defined by means of a mask suitably positioned upon the gallium arsenide substrate surface. The thickness of the metal contact obtained depends directly upon the thickness of the deposited halide compound. Thus, assuming 100 percent decomposition a 5 mil layer of $PbBr_2$ will yield a lead contact approximately 1.6 mils thick. Approximately the same relative thicknesses apply to $SnCl_2$ an $SnBr_2$, whereas in the case of $PbCl_2$ a 5 mil coating will yield approximately 2 mils of lead. Following the coating step, the gallium arsenide wafer is placed upon the strip heater and heated to a temperature sufficient to decompose the halide, typically within the range of 450–550° C. It has been found that large area ohmic contacts may be formed on gallium arsenide by lead bromide ($PbBr_2$) by heating to a temperature of approximately 550° C. Decomposition is found to occur at 500° C. if the heating period is extended or a mild vacuum is used. Tin bromide ($SnBr_2$) effectively decomposes at 500° C. and stannous chloride ($SnCl_2$) at about 450° C. It is therefore apparent that the decomposition temperature is extremely variable depending upon the halide chosen.

During the decomposition step of the invention, the elemental metal, that is, tin or lead, is deposited upon the contact region, the halogen being emitted in gaseous form. Continued heating results in alloying of the free metal with the gallium arsenide. After alloying, the substrate wafer was washed in a suitable solvent to remove any excess halide and etched to remove a few microns of gallium arsenide around the contact.

Contacts prepared in the foregoing manner were evaluated on the degree and uniformity of the wetting and on the electrical properties of the contact. The resultant contact was considered to be ohmic if the I-V characteristics proved to be linear over several orders of magnitude of current.

In cases where the wetting was considered good and the contact rectifying, an angle lap through the alloy region with subsequent staining to bring out the junction was used to determine the extent of the regrown region. Capacitance-voltage measurements were performed on these alloyed junctions to verify the $l/C^2$ vs. V step junction dependence.

Results indicate that good rectifying junctions can be obtained by this method. Accordingly the formation of alloy p-n junctions is considered within the scope of this invention.

What is claimed is:

1. A method for forming an alloy contact to gallium arsenide which comprises coating the contact region with a compound selected from the group consisting of $SnCl_2$, $SnBr_2$, $PbCl_2$, and $PbBr_2$ in the absence of elemental metals and heating the coating for a time period at a temperature sufficient to decompose the compound thereby leaving a metal film on the contact region the said metal film being alloyed with the gallium arsenide upon continued heating.

2. The method of claim 1 wherein the contact is ohmic.

3. The method of claim 1 wherein the compound is $PbBr_2$ and the coating is heated to a temperature of at least 500° C.

4. The method of claim 1 wherein the compound is $SnBr_2$ and the coating is heated to a temperature of at least 500° C.

5. The method of claim 1 wherein the compound is $SnCl_2$ and the coating is heated to a temperature of at least 450° C.

References Cited

UNITED STATES PATENTS

| | | | |
|---|---|---|---|
| 2,887,416 | 5/1959 | Van Amstel | 148—182 |
| 3,390,024 | 6/1968 | Stein | 148—182 |

RICHARD O. DEAN, Primary Examiner

U.S. Cl. X.R.

148—185